United States Patent [19]

Theijsmeijer

[11] 4,150,584
[45] Apr. 24, 1979

[54] DOUBLE FLEXING CHAIN

[75] Inventor: Frederik Theijsmeijer, Racine, Wis.

[73] Assignee: Rexnord Inc., Milwaukee, Wis.

[21] Appl. No.: 816,243

[22] Filed: Jul. 18, 1977

[51] Int. Cl.$^2$ .................... F16G 13/06; F16G 13/08
[52] U.S. Cl. .............. 74/255 R; 74/250 R;
74/250 C; 74/251 R; 74/251 C
[58] Field of Search ............ 74/245 P, 245 C, 245 S,
74/251 R, 251 C, 251 S, 254 R, 255 S, 256, 250
R, 250 S, 250 C, 252, 253 R, 253 S, 255 R;
104/172 C; 198/851, 852; 403/157, 158, 131;
59/35 CP

[56] References Cited

U.S. PATENT DOCUMENTS

| 1,660,354 | 2/1928 | Phelps ............................. 74/254 |
| 1,748,334 | 2/1930 | Evans .............................. 74/254 |
| 1,825,675 | 10/1931 | Morse ........................... 74/251 R |
| 1,866,318 | 7/1932 | Muhlenbruch ................... 74/246 |
| 2,004,321 | 6/1935 | Hay .................................. 74/246 |
| 2,332,408 | 10/1943 | Stenger ........................... 74/254 |
| 2,612,056 | 9/1952 | Prox, Jr. et al. ................. 74/254 |
| 2,638,009 | 5/1953 | Beveridge ....................... 74/254 |
| 2,816,453 | 12/1957 | Frank et al. .................. 74/251 R |
| 3,056,308 | 10/1962 | Burrows ........................... 74/254 |

FOREIGN PATENT DOCUMENTS

| 210323 | 8/1907 | Fed. Rep. of Germany .......... 198/851 |
| 296291 | 8/1928 | United Kingdom ..................... 74/254 |
| 1189949 | 4/1970 | United Kingdom ................... 198/852 |

Primary Examiner—Samuel Scott
Assistant Examiner—William R. Henderson

[57] ABSTRACT

A block and bar chain of the trolley conveyor type includes a center link having U-shaped bushing inserts at the ends of the link. The inserts with the center link are respectively turnable on the pins; the center link is pivotable on either insert about a separate axis normal to that of the pins. The improved double flexure of the chain reduces the stress in the chain parts comprising the joint and in turn allows the center link and the inserts in particular to be of a molded plastic construction of the required configuration. The inserts have pivot and retaining means and their plastic construction permits their "snap-in" assembly.

14 Claims, 5 Drawing Figures

DOUBLE FLEXING CHAIN

BACKGROUND OF THE INVENTION:

The present invention was made in the course of applicant's design and development of a substitute for a certain type of drop forged chain which is used in trolley conveyors. U.S. Pat. Nos. 1,901,850 and 1,962,531 show such conveyors. Such chain operates in a generally horizontal loop over a number of sprockets and below a track. Wheeled brackets hang from the track and support the chain at regular intervals and the individuals articles to be conveyed. The track is also inclined as required to lift or lower the articles in the course of movement. As a consequence, it is necessary that the chain may flex in a vertical plane as well as articulate in the horizontal plane.

The drop forged chain referred to includes center links and pin links in the form of extended loops with lengthwise slots and pins extending therethrough. The pins are T-headed and their opposite projections are retained in the sides of the pin links. While the ends of the center links maintain the spacing between the pin links, the narrower mid-section of the center link allows any of the several links to be assembled or disassembled in a known manner. Specifically, with the center link mid-section between the ends of two pin links, the latter may be brought closer together to release the pin and allow it to be turned 90° and withdrawn through the aligned slots. For assembly, the pin may be inserted through the slots and turned 90°. With the wider end of the center link again disposed between the ends of the two pin links, the pin is again retained as provided for.

A typical chain of this type may have a pitch of six inches. A smaller size has a pitch of three inches, a tensile strength of 24,000 pounds and a working load rating of 2800 pounds. A main reason for this relatively low load rating is the wear of the pin and the center link which results from their sliding movement under load when the chain flexes in a vertical plane.

Applicant's substitute chain includes links of a similar configuration so as to be interchangeable therewith but is of a molded plastic construction for less cost and corrosion resistance. A homopolymer acetal resin sold under the trademark "Delrin" is an exemplary material but provides a chain having a tensile strength of only 3,000 pounds and a proportionately low load rating for much the same reason, namely the extremely high corner loading imposed on the center links by the pins when the chain flexes as required.

While the object of the present invention has been to overcome this problem in this type of chain, the present invention is also expected to provide an improvement in any number of difference types of chain where flexing normal to normal articulation is required.

SUMMARY OF THE INVENTION

The invention in its broadest aspect comprises an improved link and a bushing therefor which is disposed between the bushing link and the pin of the next adjacent link to provide normal articulation of the two links about the axis of the pin and to allow relative pivotal movement about a second axis normal to the first axis. The pivot axis may be offset toward the center of the bushing link where the geometry of the links makes this desireable. The geometry of the bearing surfaces between the bushing link and its bushing resembles a tore. Such a tore is defined here as the surface generated by a half-circle encompassing the front, or bearing side of the pin and rotated about the pivot axis.

While the cross-section of the bushing link within given outer dimensions must necessarily be reduced to accommodate the bushing, the invention is unique in that there is a net gain in the tensile strength of the link.

The invention in one form of chain includes alternately arranged pin link and center link assemblies. The adjacent assemblies are adapted to articulate about parallel first axes in one plane and pivot about parallel second axes in a plane normal thereto. Each said pin link assembly includes a spaced pair of outer links and a cross pin interconnecting each of the corresponding ends of said outer links and having a round intermediate shank; more particularly, an improved center link assembly includes a center link in the form of an extended loop and U-shaped oppositely facing inserts within the loop at the ends of the center link, the inside of the center link being defined by spaced parallel plane surfaces joined by tores at the ends of the link, said plane surfaces being parallel to said first axes, said second axes being an axis of a tore. The insert corresponds with the bushing previously described and each end of the center link includes the improvement of the bushing link previously described.

According to the invention, means are provided for the ready assembly of the link and its insert and for preventing the insert from falling out as in handling the chain or under other circumstances.

Further according to the invention, each insert includes pivot means on the second axis which further serves to keep the insert in assembled relation with the center link. In particular each pivot axis is offset from the articulation axis whereby the center link is allowed a greater pivot range.

DESCRIPTION OF THE PREFERRED EMBODIMENT

Figure 1:
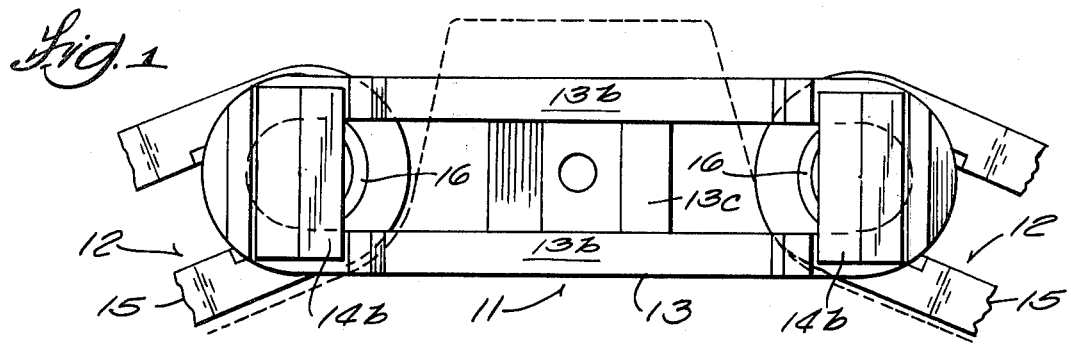
FIG. 1 is a plan view of several links of the chain of the present invention as they would engage a sprocket having a vertical axis. The sprocket is shown in part by broken lines.

The chain shown in the drawings includes a pin link assembly 11 and the center link assembly 12. Each pin link assembly 11 includes the similar or identical pin links 13 and the pin 14. Each center link assembly 12 includes the center link 15 and an insert 16 at each end of link 15.

Figure 2:
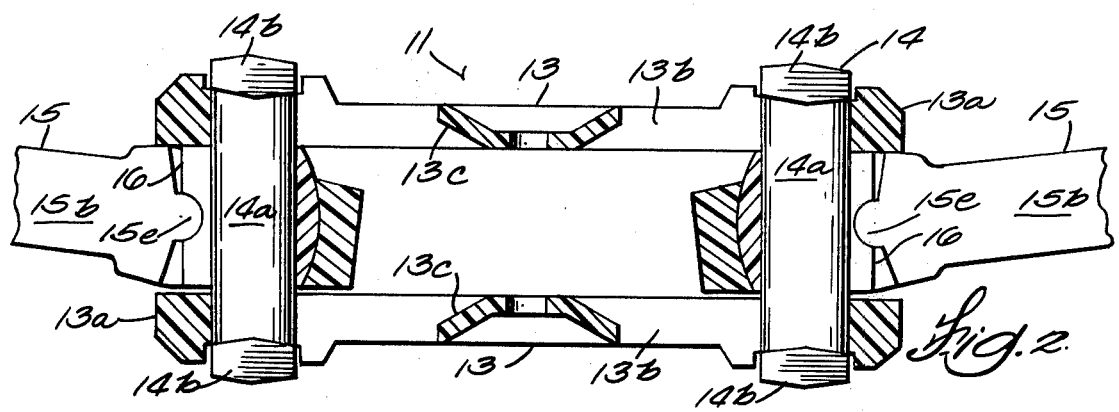
FIG. 2 shows several links in side elevation and as they would appear in transition between a downward and an upward run.
Figure 3:
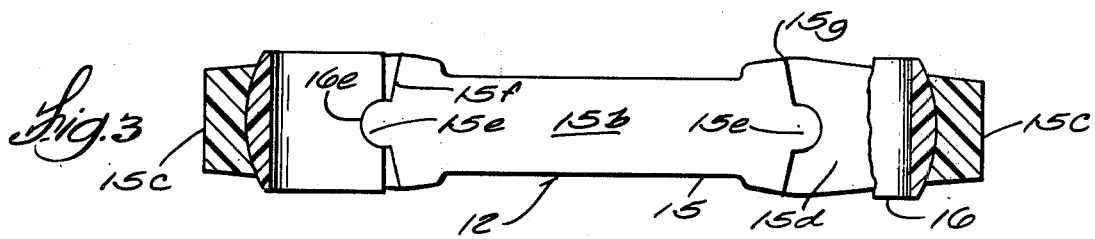
FIG. 3 is a longitudinal section of a center link assembly. The insert at the right is broken away to show the pivot portions of the center link.

The pin links 13 and center links 15 of the chain shown are molded of the homopolymer acetal resin sold under the trademark "Delrin." Each pin link 13 is in the form of an elongated loop having ends 13a (FIG. 2), parallel reach bars 13b and a central web 13c joining bars 13b.

Figure 4:
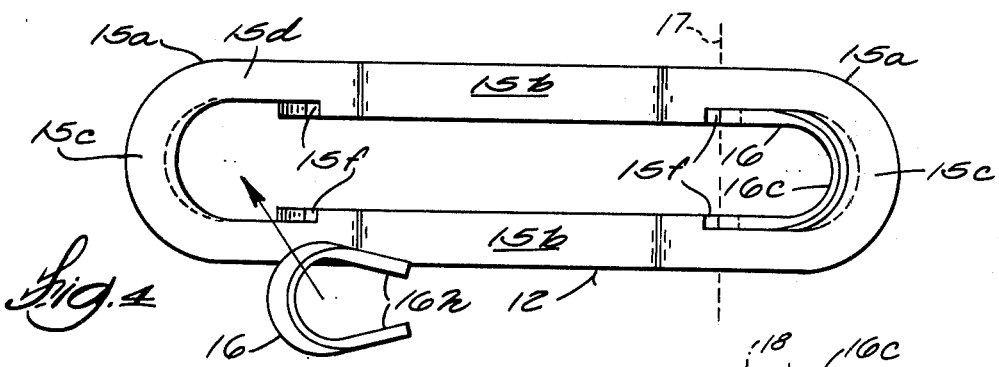
FIG. 4 is a plan view of the center link assembly shown in FIG. 3. The insert at the left is in position preparatory to assembly.

Each center link 15 is in the form of an elongated loop having U-shaped ends 15a (FIG. 4) and a mid-section comprising spaced, parallel connecting bars 15b. Each U-shaped end 15a has a bight 15c and spaced legs 15d. The bars 15b connect the corresponding legs 15d of the two ends 15a of each link 15. Its other dimensional features will be described hereinafter.

Each pin 14 is of metal and includes a round shank 14a. The two projections 14b at each end of the pin form a "T-head" and the four projections of each pin lie in the same plane. The insert 16 is U-shaped and includes a bushing portion 16a and two pivot arms 16b. The bushing portion 16a of each insert 16 has a cylindrical bore 16c in which the central portion of shank 14a of a pin 14 is turnable. The outer bearing surface 16d will be described. hereinafter.

In the assembled chain as shown, and with reference to one end of a pin link assembly 11, the shank 14a of pin 14 also extends through the slots of ends 13a of the pin links 13 and bears against the ends of the slots. Pin links 13 are spaced by links 15 and by insert 16 so that the projections 14b or T-heads of the pins are disposed in the respective recesses of the two links in a known manner.

The relative pivotal movement of each center link 15 which is provided relative to the inserts 16 of the same assembly 12 allows the chain to flex in a plane normal to the plane in which the link assemblies of the chain articulate. The present invention is characterized by the manner in which the insert 16 is fitted and pivotable in the end of the center link. The pivot axis is designated by the broken line 17 in FIG. 4 and could intersect the axis of pin 14. As shown, the axis is normal to that of the pin and is offset therefrom toward the mid-section of the center link.

The geometry of the corresponding surface of bight 15c of link 15 is of critical importance to the tensile strength of the link. While the geometry described provides for the pivotal movement of the link on axis 17, the link, nonetheless, loops evenly around the pin so that tensile stresses in the link imposed by a chain load are well distributed throughout so that the maximum strength of the material of link 15 is utilized in the chain.

Figure 5:
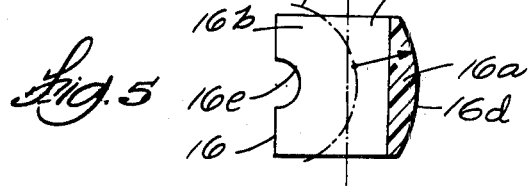
FIG. 5 is a section of the insert and shows the geometrical development of its outer bearing surface.

The inner surface of bight 15c of the center link and the outside of bushing 16a of insert 16 are parts of a "tore," this being the surface generated by a circle rotated about an axis in the plane of the circle. With reference to FIG. 5, the "tore" is defined by a semi-circle having a radius about 20% larger than that of bore 16c of bushing portion 16a or of shank 14a. This semi-circle is held in the plane of axis 17 and is rotated about axis 17 so that its center generates also the circle 18 (see FIG. 5). Circle 18 is located approximately on the axis of bore 16c or, as shown, intersects twice the axis of bore 16c. In a typical chain the thickness of the insert can be in the order of one-eighth to one-quarter of an inch (3.18 mm to 6.35 mm) and minimal so that the cross-section of the center link between its allowable outer dimensions and the insert is not significantly reduced. This thickness is also such that the portion 16a has adequate strength after some wear. As shown, the inserts 16 interiorly form the ends of the interior slot of each center link 15.

The U-shaped end 15a of center link 15 has its maximum width at pivot 17 as determined by the spacing of pin links 13 such that each side of the link allows and also determines the desired flexing of the chain on axis 17.

As shown, the bosses 15e project toward each other interiorly of center link 15 and at the pivot axis 17 and fit within corresponding recesses 16e of the arms 16b of the insert 16. Bosses 15e thus provide also a hub about which the insert may pivot relative to the center link. Additionally, the center link is interiorly dimensioned to include the abutments 15f on each side of the boss 15e which limits the relative pivotal movement and provides the positive retention of the insert.

Insert 16 is molded of a nylon resin which is sold under the trademark "Zytel" to provide the bushing portion 16a with good wear resistance and the projecting pivot arms 16b with some elasticity for assembly purposes with respect to the retaining bosses 15e of center link 15. Pinching the arms 16b closer together more or less compresses the insert and allows the insert to be positioned in the end 15a of the center link. When the insert is in place and the arms are released, the insert will then expand and be retained particularly while the chain is disassembled. Also, in some installations of chain of the type shown in the drawings, the links may be pushed together as the chain comes off of the drive sprocket. In such cases it is especially important that the inserts be held in place by some means.

For that purpose abutments 15f of link 15 are formed interiorly of link 15 to engage the ends of the two pivot arms 16b of insert 16 and are located so that the insert may only pivot relative to the link on axis 17 to whatever extent is required.

OTHER EMBODIMENTS OF THE INVENTION

The present invention is directed to an insert for a link which loops around the pin. At least a part of the insert fits therebetween. The invention in its broadest aspect comprises any such insert wherein the part referred to has inner and outer bearing surfaces, the inner surface being cylindrical to fit the pin and the outer surface being a "tore" generated about said transverse axis.

The invention in its next broadest aspect includes a flexible insert which requires being deformed in one way or another to allow its being put into place in the link and which in its normal condition is retained by the link. The invention in its next broadest aspect includes such an insert and link having a supplementary pivot bearing on the transverse axis. The disclosure of all of these aspects is included in the above disclosed preferred embodiment of the invention.

I claim:

1. A chain comprising a series of pin link assemblies and bushing link assemblies, each pin link assembly including laterally spaced pin links and a pin having ends carried by said pin links and having an intermediate cylindrical section, each corresponding bushing link assembly including a center link and a bushing, said bushing being disposed between the pin links and having an outer load bearing surface and an inner cylindrical load bearing side in direct engagement with said cylindrical section of the pin, the end of the center link extending between the pin links and around the bushing and having an inner load bearing surface in direct engagement with the outer load bearing surface of the bushing, the end face of the center link being adapted for driving engagement as by the tooth of a drive sprocket, the two link assemblies being adapted to articulate on the centerline of the pin, said surfaces of the bushing and center link being tores generated by a semi-circle which is minimally large in diameter than the pin and is rotated about an axis normal to that of the pin but offset therefrom toward the opposite side thereof and providing the chain with means for the pivotal movement of the center link relative to the bushing and pin link assembly about said axis for operation of the chain in a curved path.

2. The chain of claim 1 wherein the bushing and center link include pivot bearings on said axis normal to that of the pin which serves to retain the bushing and center link in assembled relation.

3. The chain of claim 1 which is of the block and bar type and wherein each pin link assembly includes a pin at each end of the respective pin links and each bushing link assembly includes a bushing at each end of the center link.

4. The chain of claim 3 wherein the bushings are U-shaped and disposed with their open ends extending toward each other.

5. The chain of claim 4 which is more particularly of the trolley conveyor type wherein the bushing link assembly is in the form of a loop and of varying dimension normal to the plane of the loop, namely having tapered ends and a narrow center section, the pins are T-headed and the pin links have slots at their ends for the pins and recesses for their heads allowing for chain assembly and dissassembly.

6. The chain of claim 2 wherein the bushing is U-shaped and its pivot bearings are at its open ends and the bushing is elastic to the extent that its ends may be pinched together to allow insertion of the bushing in the bushing link.

7. In a chain comprising a series of pin links and bushing links, the improved chain joint which allows the adjacent links to articulate in a first plane such as for training around a drive sprocket and to pivot in a second plane normal to the first such as for following a curved path in either direction and comprising a pin carried by the pin link and a bushing carried by the bushing link, said bushing and bushing link having means for their rotation together on the centerline of the pin and said bushing and bushing link having means for their relative pivotable movement; on an axis normal to said centerline and offset therefrom toward the center of the bushing link.

8. The chain of claim 7 wherein the bushing and center link include pivot bearings on said axis normal to that of the pin which serves to retain the bushing and center link in assembled relation.

9. The chain of claim 7 which is of the block and bar type and wherein each pin link includes a pin at each end thereof and each bushing link includes a bushing at each end thereof.

10. The chain of claim 9 wherein the bushings are U-shaped and disposed with their open ends extending toward each other.

11. The chain of claim 10 which is more particularly of the trolley conveyor type wherein the bushing link is in the form of a loop and of varying dimension normal to the plane of the loop, namely having tapered ends and a narrow center section, and the pins pin links have means whereby one or more pins may be removed as desired through the loops.

12. A chain link having one end in the form of a loop to extend between the spaced ends of an adjacent link of the chain and around a pin having its ends fixed in the spaced ends of the adjacent link, said link having a U-shaped insert fitting within said loop and comprising spaced parallel legs and an intermediate bushing portion, said bushing portion having an inner cylindrical surface for bearing engagement with the pin such that the insert with the link is turnable on the pin for chain articulation and having an outer curved surface for bearing engagement with the link, said bushing portion and the link therewith comprising means for pivoting of the link on the insert for chain side flexing about an axis normal to that of the pin, the ends of the legs and portions of the link forming abutment means which secure the insert within the loop of the link while allowing the link to pivot on the insert to the extent required for such chain side flexing, said insert being sufficiently flexible and said legs being of a length such that their spacing can be narrowed to allow the insert to be inserted in the loop of the link.

13. The chain link of claim 12 wherein the abutment means further comprise pivot bearings on said axis normal to that of the pin.

14. The chain link of claim 12 which includes an insert at each end thereof and is to comprise the center link assembly for a chain which is of the trolley conveyor type wherein the center link is in the form of a loop and is of varying dimension normal to the plane of the loop, namely having tapered ends and a narrow center section, the pins are T-headed and the pin links have slots at their ends for the pins and recesses for their heads which allows for chain assembly and disassembly.

* * * * *